(12) United States Patent
Harper et al.

(10) Patent No.: US 7,061,712 B2
(45) Date of Patent: Jun. 13, 2006

(54) MONO POLE PIECE FOR A TWO STAGE TAPE DRIVE ACTUATOR

(75) Inventors: David Howard Flores Harper, San Jose, CA (US); Wayne Isami Imaino, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/992,044

(22) Filed: Nov. 17, 2004

(65) Prior Publication Data

US 2006/0103971 A1 May 18, 2006

(51) Int. Cl.
*G11B 5/584* (2006.01)
(52) U.S. Cl. .................................. 360/77.12
(58) Field of Classification Search ............ 360/77.12, 360/78.02, 261.1, 291, 241, 241.3
See application file for complete search history.

(56) References Cited

U.S. PATENT DOCUMENTS

| 5,434,732 | A | * | 7/1995 | Schwarz et al. ......... 360/78.02 |
| 5,508,864 | A | | 4/1996 | Briggs et al. |
| 5,548,568 | A | * | 8/1996 | Hirose ...................... 369/44.14 |
| 5,726,834 | A | | 3/1998 | Eckberg et al. .......... 360/261.1 |
| 5,731,935 | A | * | 3/1998 | Lian et al. .................. 360/291 |
| 5,761,006 | A | | 6/1998 | Sri-Jayantha et al. |
| 5,901,008 | A | * | 5/1999 | Nayak et al. ............. 360/78.02 |
| 6,229,674 | B1 | | 5/2001 | Todd ....................... 360/261.1 |
| 6,437,946 | B1 | | 8/2002 | Todd ....................... 360/261.1 |
| 6,636,384 | B1 | * | 10/2003 | Inoguchi et al. ......... 360/261.1 |
| 2001/0046106 | A1 | | 11/2001 | Todd ....................... 360/261.1 |

FOREIGN PATENT DOCUMENTS

JP        2000357376        12/2000

* cited by examiner

*Primary Examiner*—David Hudspeth
*Assistant Examiner*—James L Habermehl
(74) *Attorney, Agent, or Firm*—Zilka-Kotab, PC

(57) ABSTRACT

An actuator device includes a pole piece and at least one magnet for generating a magnetic field. A coarse positioner having a coil surrounding the pole piece provides coarse actuation in a direction parallel to an axis of the pole piece. A fine positioner having a coil surrounding the pole piece provides fine actuation in a direction generally parallel to an axis of the pole piece.

28 Claims, 5 Drawing Sheets

MONO POLE PIECE FOR A TWO STAGE TAPE DRIVE ACTUATOR

FIELD OF THE INVENTION

The present invention relates to drive actuators, and more particularly, this invention relates to a two stage tape drive actuator having a single pole piece to drive both actuators.

BACKGROUND OF THE INVENTION

Tape drives typically utilize an actuator mechanism to position the read/write head over the appropriate tracks while the tape is moving. Current read-write head positioning devices used in magnetic tape drives to align the read-write head with data in the magnetic tape often incorporate a two-actuator design. One actuator provides coarse positioning to move the read-write head between data bands. The other actuator provides fine positioning to maintain alignment between the read-write head and the data tracks. In use, the coarse positioner first moves the read/write head to the general vicinity on the tape and then the fine actuator is used for track following while the tape is in motion. The two actuators are usually mounted in a "piggyback" arrangement with the fine position actuator riding on the coarse position actuator.

The coarse positioning actuator is typically a linear stage driven by a stepper motor. Stepper motors have the ability to move the linear stage anywhere across the width of the magnetic tape at modest speeds. However, most stepper motors lack the accuracy and bandwidth necessary to maintain alignment between the read-write head and the data tracks as the magnetic tape moves across the face of the read-write head.

The fine positioning actuator is typically a voice coil motor (VCM) mounted on the linear stage and held at a rest position by some type of spring. A voice coil actuator provides micron to submicron precision positioning at a bandwidth of hundreds to thousands of hertz. However, a single voice coil and spring combination that can meet the fine positioning requirements across the full width of the tape is expensive and unnecessary.

The combination of coarse positioning and fine positioning is desired to meet the requirements associated with reading and writing on the magnetic tapes. Current solutions involve two actuators, their respective controllers, a significant amount of hardware, and a larger footprint in the tape drive. What is desired is more simple, high performance, positioning device that requires minimal hardware.

SUMMARY OF THE INVENTION

A unique two stage actuator design that uses a single pole piece in a magnetic path to drive two actuators. The inventive actuator device provides a compact, reduced cost design that utilizes one voice coil motor (VCM) assembly to drive both the fine and the coarse positioners. The cost reduction is realized due to the removal of one of the positioner motors. The compactness of the design is realized due to the integration of the two stage system into a single VCM assembly making it suitable for compact tape drive designs.

The actuator device according to one embodiment includes a pole piece and at least one magnet for generating a magnetic field. A coarse positioner having a coil surrounding the pole piece provides coarse actuation in a direction parallel to an axis of the pole piece. A fine positioner having a coil surrounding the pole piece provides fine actuation in a direction generally parallel to an axis of the pole piece.

The coils reside in a gap formed between the pole piece and the at least one magnet. The fine positioner includes a fine positioner bracket coupled to the coarse positioner. The fine positioner bracket is preferably pivotally coupled to the coarse positioner. An object such as a tape head can be coupled to a distal end of the fine positioner bracket. Ideally, the fine positioner bracket with the object coupled thereto has a combined center of mass positioned about at a point of pivoting of the fine positioner bracket. The coarse positioner can be free floating, i.e., no source of biasing exerts a bias on the coarse positioner is present in the device, or may be held at nominal position with a spring system.

An optional damping mechanism can be provided for damping movement of the coarse positioner. Such a damping mechanism can be pneumatic (e.g., piston and cylinder), frictional, etc.

A housing can be provided for constraining the magnetic field created by the at least one magnet.

A controller is in communication with each of the coils and a tape head. In use, the controller can provide current independently to each of the coils for adjusting positions of the coarse and fine positioners based on servo signals received from the tape head.

The two stage actuator device proposed herein has the following advantages. First, by eliminating the need for a complete additional motor, the overall cost of the actuator assembly is reduced. Second is the compact design allows for integration into smaller form factor tape drives, such as half high. The final advantage is that the bandwidth of the whole actuator system should be higher than that of typical two stage actuator systems containing a stepper motor. The improved response is a result of the fact that stepper motors are typically gear reduced and therefore cannot rotate as quickly as current can be adjusted in the coarse positioner coil. The fine positioner coil should have a response similar to other fine motion VCM drive tape drive actuators. Combining both the coarse and the fine response time results in a net improvement for actuator response capability.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The following description is of a unique two stage actuator design that uses a single pole piece in a magnetic path to drive two actuators. The inventive actuator device provides a compact, reduced cost design that utilizes one voice coil motor (VCM) assembly to drive both the fine and the coarse positioners. The cost reduction is realized due to the removal of one of the positioner motors. The compactness of the design is realized due to the integration of the two stage system into a single VCM assembly making it suitable for compact tape drive designs. While the actuator device has particular applicability to tape drives, the actuator device can be implemented in any system where actuation is needed. To aid the reader and to place the actuator device in a context, the following description shall be described in terms of an actuator device for positioning a tape head with respect to a tape passing over the tape head.

Figure 1:
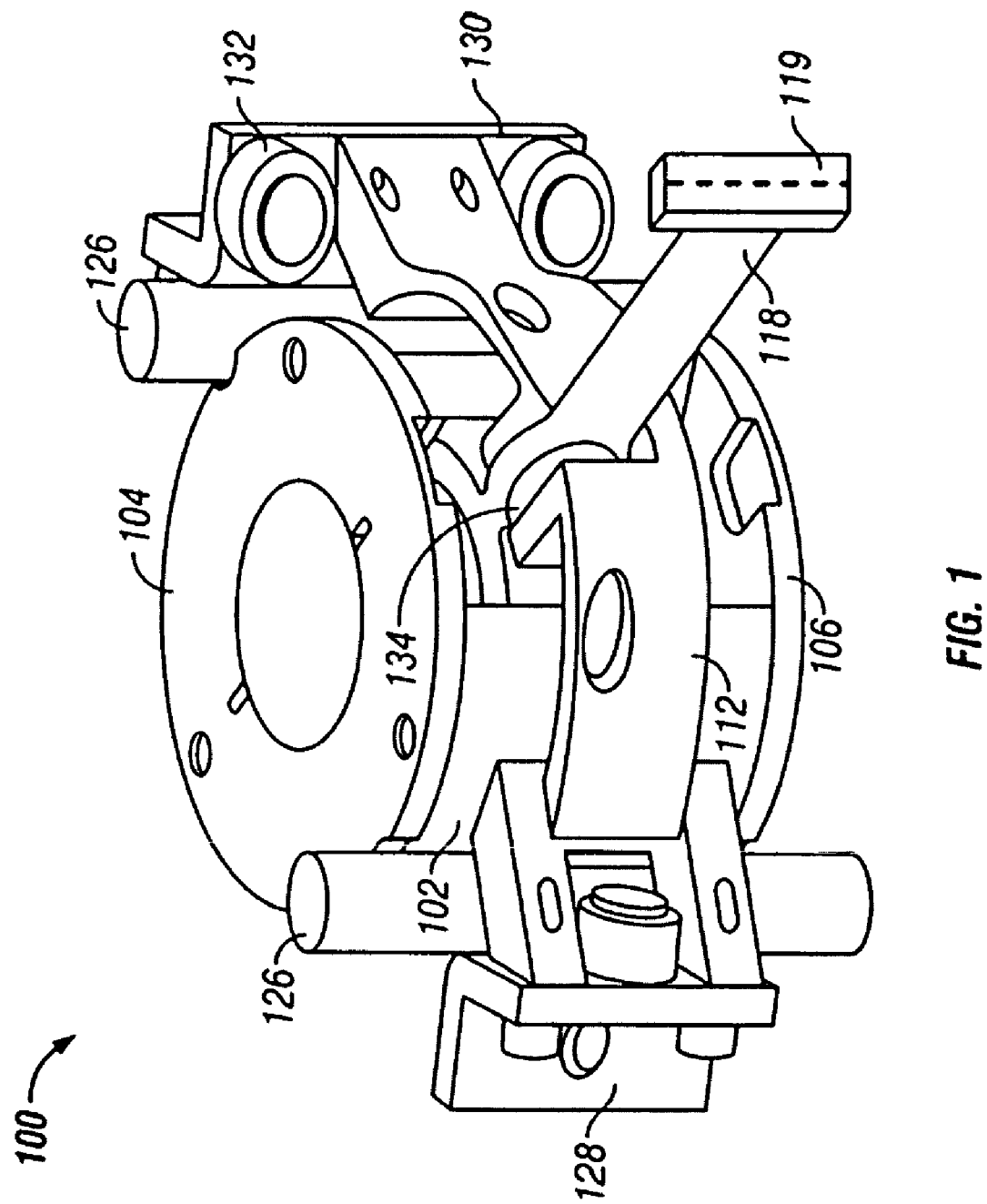
FIG. 1 is an isometric view of a two stage actuator device.
Figure 2:
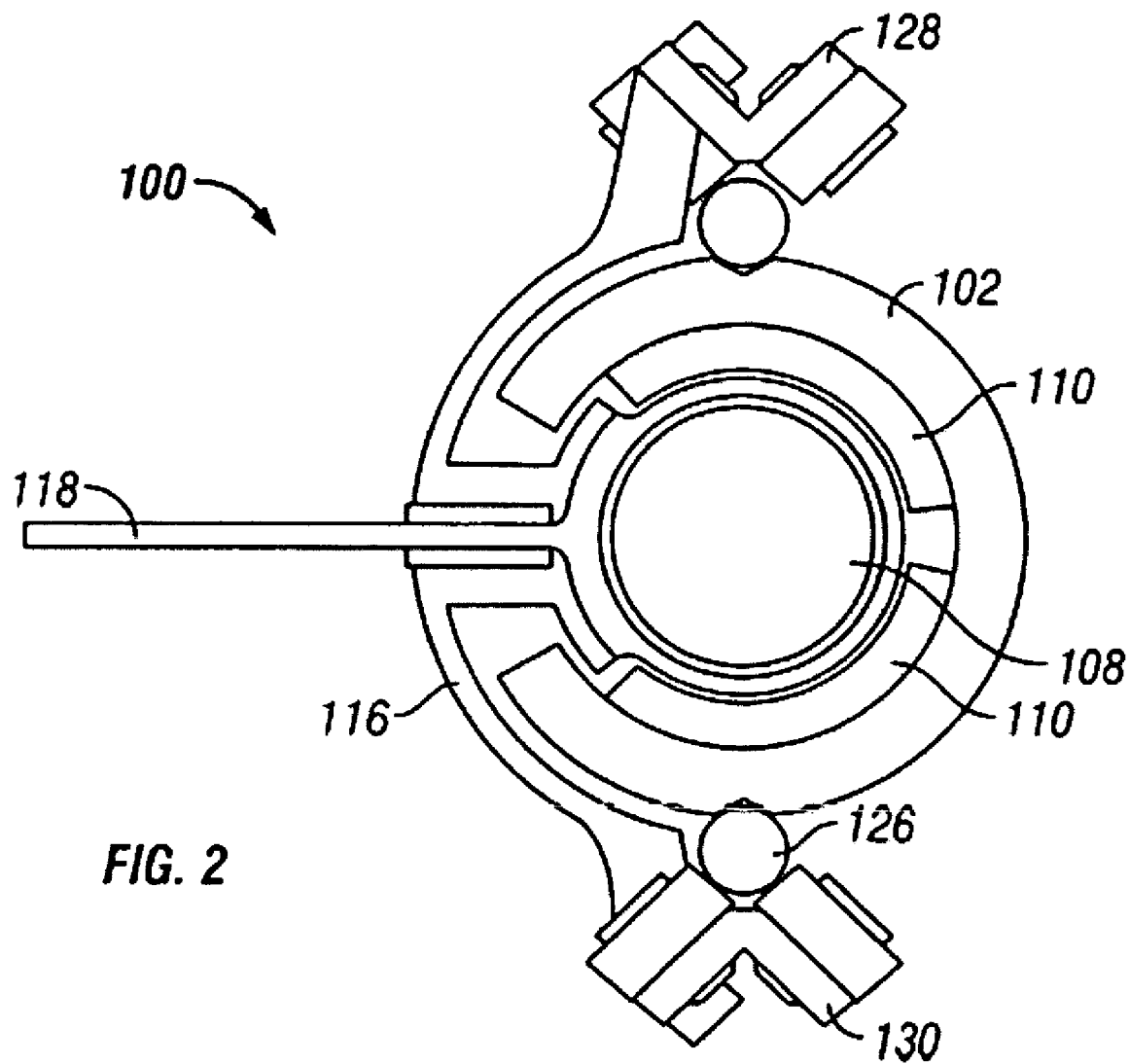
FIG. 2 is a top view of the actuator device with the top cover removed.
Figure 3:
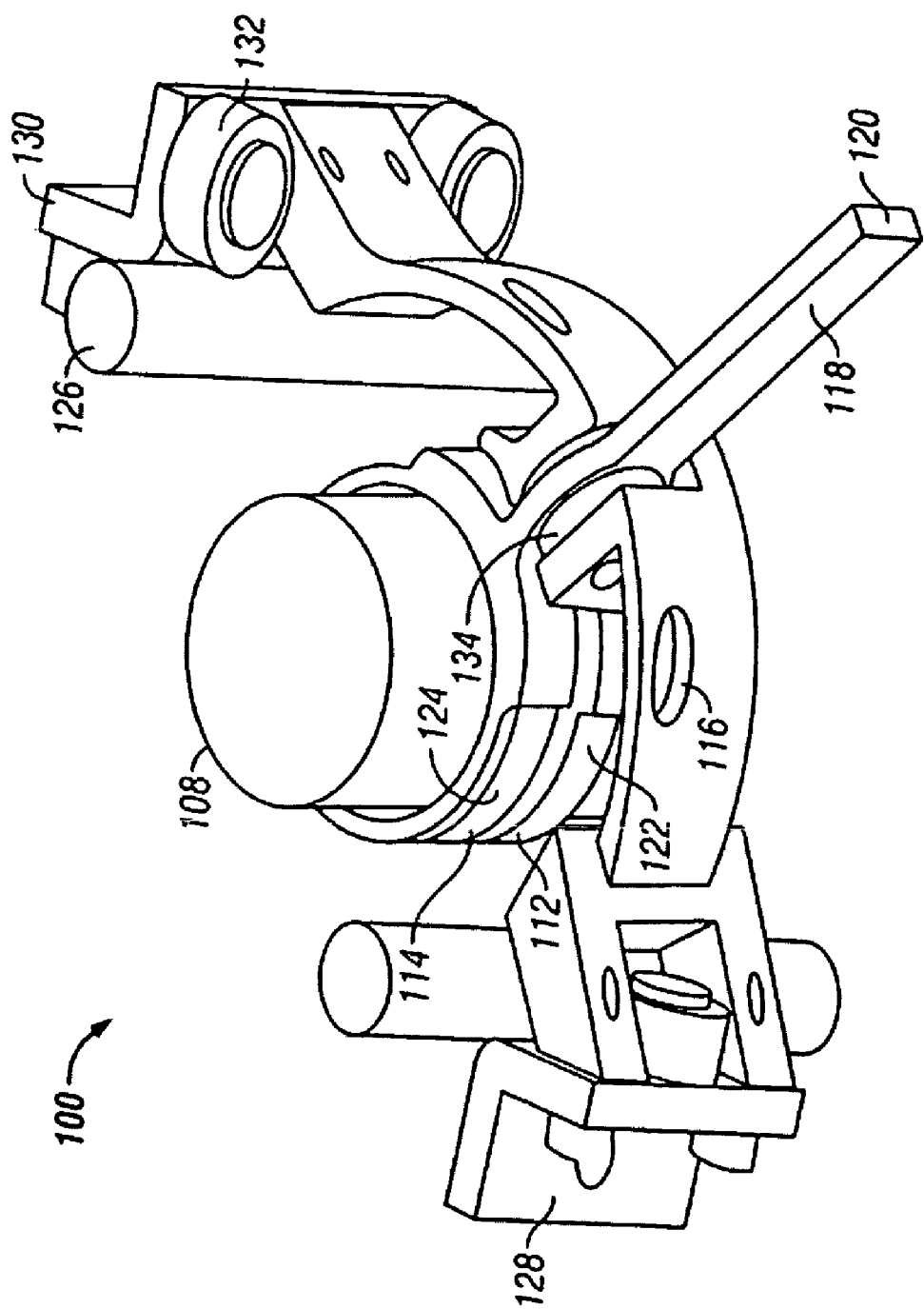
FIG. 3 is a partial isometric view of the two stage actuator device.

FIGS. 1, 2 and 3 illustrate an actuator device 100 according to a preferred embodiment. As shown, the actuator device 100 includes a magnetic housing 102, covers 104, 106, a pole piece 108 and one or more magnets 110. A coarse positioner 112 and a fine positioner 114 operate to position a tape head 119 at various points along a path extending generally parallel to the axis of the pole piece 108. The coarse positioner 112 is coupled to a coarse positioner bracket 116 that travels with the coarse positioner 112. The fine positioner 114 includes a fine positioner bracket 118 coupled to the coarse positioner bracket 116. A tape head 119 is coupled to a distal end 120 of the fine positioner bracket 118.

The magnets 110 are polarized to direct magnetic flux emitted therefrom towards the pole piece 108. The field emitted by each magnet is preferably relatively constant along the length of magnet. Any suitable magnetic material can be implemented, though the designer should consider the impact of the magnetic flux on other components of the final system in which implemented as well as on the tape. The housing 102 helps to keep the flux container to the actuator device 100, so that it does not interfere with operation of the device or data stored on the tape. The housing 102 also helps prevent external magnetic fields, e.g., from the drive motors, and from affecting the positioners.

The pole piece 108 is preferably a solid member having, but not limited to, a cylinder-shaped outer surface, and that is designed to allow the coarse positioner 112 to move the read/write head 119 to all possible positions on the tape. The pole piece 108 is preferably constructed of a material capable of channeling the flux emitted by the magnets 110. Illustrative metals from which the pole piece 108 can be constructed include iron and iron alloys.

Coils 122, 124, one for each positioner 112, 114 and each operating independently, surround the pole piece 108 and lie in the gap established by the pole piece outer diameter and the inner diameter of the magnets 110. The magnetic field generated by the pole piece 108, covers 104, 106, housing 102 and magnets 110, passes through the coils 122, 124 in an orientation that will cause a displacement when current is applied through the desired coil. The displacement will then move the intended positioner 112, 114. More particularly, when current is applied to the coarse positioner coil 122, the coarse positioner bracket 116 will move in the intended direction. The fine positioner bracket 118 is carried along with the coarse positioner bracket 116 regardless of the presence of current in the fine positioner coil 124. Typically, once the target region on the tape has been reached the fine positioner coil 124 will be activated to precisely position the read/write head 119 over the desired location on the tape. During track following the current is always being adjusted through both coils 122, 124 to handle the excursion of the tracks on the tape as well as the lateral motion of the tape while the tape is moving.

As mentioned above, the coarse positioner bracket 116 is driven by the coarse positioner coil 122 and provides support for the fine positioner bracket 118. The coarse positioner 112 does not require any biasing, and can be essentially free floating. If no biasing is present, any force induced by the coils 122, 124 will tend to make the coarse positioner bracket 116 want to keep moving. Thus, the coils 122, 124 are continuously adjusted to keep the coarse positioner bracket 116 and fine positioner bracket 118 in about the desired position (as in a disk drive actuator system). The same is true for incident biasing. For instance, if the actuator device 100 is oriented vertically, gravity will tend to bias the carriage downward, so the coarse positioner 112 will counteract the effective biasing created by gravity. Similarly, the cables coupled to the head 119 may cause incident biasing. Note that the actuator device 100 can be increased in size to provide the force necessary to counteract gravity, biasing by cables, etc.

Guides 126 are preferably provided to stabilize and guide the coarse positioner bracket 116 along a linear path of travel. In the embodiment shown, the guides 126 are cylindrical bars positioned adjacent the housing 102 and having axes parallel to the axis of the pole piece 108. The coarse positioner bracket 116 has two roller bearing subassemblies 128, 130 that follow the guides 126. As shown, one roller bearing subassembly 128 includes two roller bearings 132 that engage the guides 126, while the other roller bearing subassembly 130 includes four roller bearings 132. By positioning one pair of roller bearings 132 in a spaced relation to the other pair on roller bearing subassembly 130, a linear movement of the coarse positioner bracket 116 is ensured. One skilled in the art will understand that other guide mechanisms can be employed with similar effectiveness. Alternative guide mechanisms include, for example, sleeves that slide along the guides 126 or the pole piece 108, moveable guide members (e.g., pistons) that move with the coarse positioner bracket 116, etc.

The fine positioner bracket 118 is preferably connected to the coarse positioner bracket 116 in a pivoting manner so that fine movement is achieved at the distal end of the fine positioner bracket 118 as the fine positioner 114 coil 124 generates movement along the pole piece 108. A pivotal coupling can be accomplished through the use of a bearing 134. This connection could also be a spring or other constraining device to bias the fine position bracket towards a nominal center. However, as with any biasing, the head 119 would be susceptible to resonance. If the drive is exposed to vibrations, the resonance can be counteracted by continuously adjusting input to the coils.

By balancing the moments of mass around the fine positioner pivot bearing 134 (accounting for the head 119, cables, etc. coupled thereto), the fine positioner actuator design is more resistant to shock and vibration than a typical cantilever spring mass system. The moment can be eliminated for the fine positioner bracket 118 by designing the position of the coil, fine positioner bracket 118, and head 119 location such that in the event of external shock and vibration the fine positioner bracket 118 will not rotate around the pivot bearing 134.

Preferred placement of the head 119 on the fine positioning bracket is centered so that the tension exerted on the head 119 by the tape does not create excessive torque. It would also be preferable to implement a head 119 such that the tape covers the whole length of the head 119 at any position thereacross. It should be noted that the head 119 can be offset. This may require the designer to increase the size of the actuator device 100 to compensate.

Movement of the coarse positioner 112 can be optionally damped. In a typical scenario, the general position of the head 119 is set with the coarse positioner 112. Then the fine positioner 114 is used to adjust the head 119 position. Thus, in a typical system, super-fast coarse response is not needed, though fast fine response time is desirable. Accordingly, some damping can be placed on the system to slow movement of the coarse positioner 112 and add increased shock resistance. One option is to use a pneumatic system, such as a piston and cylinder, coupled to the coarse positioner bracket 116. Another option is to add a frictional member to the carriage that engages the pole piece 108, guides 126, or housing 102. Yet another option is to add a frictional O-ring or member, e.g., of rubber or silicone, to the inside of the coil ring so as to frictionally engage the pole piece 108. One skilled in the art will understand that various types of damping mechanisms can be used.

In use, control of the actuator device 100 is maintained by a controller implementing servo loop algorithms to control both coils simultaneously, thereby keeping the head 119 aligned with the desired data tracks. And though the coils may tend to counteract each other at times, this can be accounted for by constantly readjusting the input to the coils. Further, since the coarse positioner coil 122 is moving a much greater mass than the fine positioner coil 124, the controller can compensate for the gain of each coil.

Figure 4:
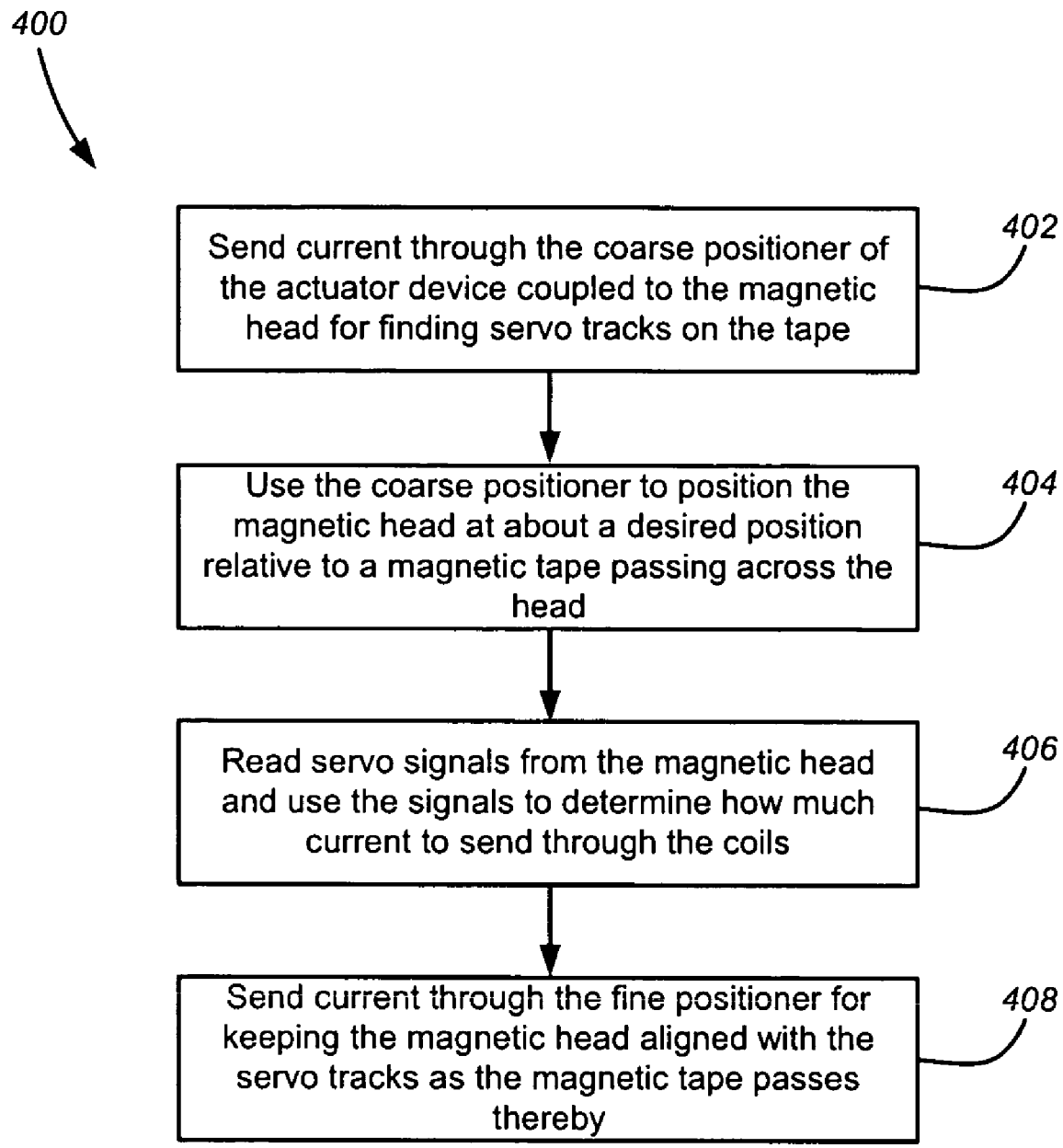
FIG. 4 illustrates a method for positioning a tape head relative to a tape.

FIG. 4 depicts a method 400 for positioning a magnetic tape head relative to a tape. In operation 402, a current is sent through a coarse positioner of the actuator device coupled to the magnetic head for finding servo tracks on the tape. In operation 404, the coarse positioner is used to position the magnetic head at about a desired position relative to a magnetic tape passing across the head. In operation 406, servo signals are read from the magnetic head and used to determine how much current to send through the coils. In operation 408, a current is sent through the fine positioner for keeping the magnetic head aligned with the servo tracks as the magnetic tape passes thereby.

Figure 5:
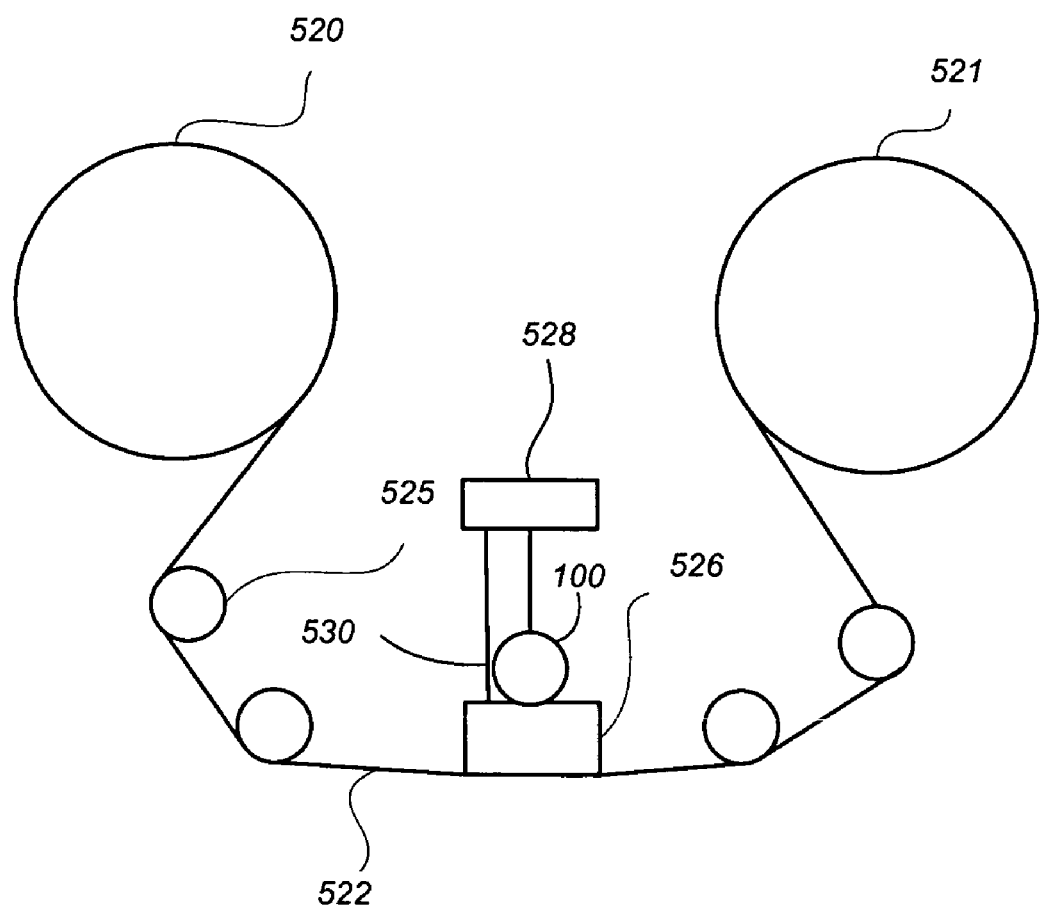
FIG. 5 illustrates a tape drive which may be employed in the context of the method of FIG. 4.

FIG. 5 illustrates a tape drive which may be employed in the context of the method 400 of FIG. 4. While one specific implementation of a tape drive is shown in FIG. 5, it should be noted that the embodiments of the previous figures may be implemented in the context of any type of drive (i.e. hard drive, tape drive, etc.)

As shown, a tape supply cartridge 520 and a take-up reel 521 are provided to support a tape 522. Moreover, guides 525 guide the tape 522 across a bidirectional tape head 526. Such bidirectional tape head 526 is in turn coupled to a controller assembly 528 via a compression-type MR connector cable 530. The actuator device 100 controls position of the head 526 relative to the tape 522.

A tape drive, such as that illustrated in FIG. 5, includes drive motor(s) to drive the tape supply cartridge 520 and the take-up reel 521 to move the tape 522 linearly over the head 526. The tape drive also includes a read/write channel to transmit data to the head 526 to be recorded on the tape 522 and to receive data read by the head 526 from the tape 522. An interface is also provided for communication between the tape drive and a host to send and receive the data and for controlling the operation of the tape drive and communicating the status of the tape drive to the host, all as understood by those of skill in the art.

The two stage actuator device proposed herein has the following advantages. First, by eliminating the need for a complete additional motor, the overall cost of the actuator assembly is reduced. Second is the compact design allows for integration into smaller form factor tape drives, such as half high. The final advantage is that the bandwidth of the whole actuator system should be higher than that of typical two stage actuator systems containing a stepper motor. The improved response is a result of the fact that stepper motors are typically gear reduced and therefore cannot rotate as quickly as current can be adjusted in the coarse positioner coil. The fine positioner coil should have a response similar to other fine motion VCM drive tape drive actuators. Combining both the coarse and the fine response time results in a net improvement for actuator response capability.

There has thus been described a two stage head positioning actuator that could fit in a half high form factor tape drive. This design is also a cost reduction from typical two stage actuator systems that use a stepper motor and a voice coil motor.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An actuator device, comprising:
a pole piece;
at least one magnet for generating a magnetic field;
a coarse positioner having a coil surrounding the pole piece for providing coarse actuation in a direction parallel to an axis of the pole piece; and
a fine positioner having a coil surrounding the pole piece for providing fine actuation in a direction generally parallel to an axis of the pole piece, the fine positioner being movable along at least a portion of the pole piece while the coarse positioner is stationary.

2. A device as recited in claim 1, wherein two magnets generate the magnetic field.

3. A device as recited in claim 1, wherein the pole piece has a generally, but not limited to, cylinder-shaped outer surface.

4. A device as recited in clam 1, wherein the coils reside in a gap formed between the pole piece and the at least one magnet.

5. A device as recited in claim 1, wherein the fine positioner includes a fine positioner bracket coupled to the coarse positioner.

6. A device as recited in claim 1, wherein no source of biasing for exerting a bias on the coarse positioner is present in the device.

7. A device as recited in claim 1, further comprising a damping mechanism for damping movement of the coarse positioner.

8. A device as recited in claim 7, wherein the damping mechanism is pneumatic.

9. A device as recited in claim 7, wherein the damping mechanism is frictional.

10. A device as recited in claim 1, further comprising a housing for constraining the magnetic field created by the at least one magnet.

11. An actuator device, comprising:
at least one magnet for generating a magnetic field;

a coarse positioner having a coil surrounding the pole piece for providing coarse actuation in a direction parallel to an axis of the pole piece; and a fine positioner having a coil surrounding the pole piece for providing fine actuation in a direction generally parallel to an axis of the pole piece, wherein the fine positioner includes a fine positioner bracket coupled to the coarse positioner, wherein the fine positioner bracket is pivotally coupled to the coarse positioner.

12. A device as recited in claim 11, wherein the fine positioner bracket has an object coupled to a distal end thereof, the fine positioner bracket with the object coupled thereto having a combined center of mass positioned about at a point of pivoting of the fine positioner bracket.

13. A device as recited in claim 12, wherein the object is a tape head.

14. An actuator device, comprising:
at least one magnet for generating a magnetic field;
a coarse positioner having a coil surrounding the pole piece for providing coarse actuation in a direction parallel to an axis of the pole piece;
a fine positioner having a coil surrounding the pole piece for providing fine actuation in a direction generally parallel to an axis of the pole piece; and
a controller in communication with each of the coils and a tape head, wherein the controller provides current to the coils for adjusting positions of the coarse and fine positioners based on servo signals received from the tape head.

15. An actuator device for a tape head, the actuator device comprising:
a pole piece;
at least one magnet for generating a magnetic field;
a coarse positioner having a coil surrounding the pole piece for providing coarse actuation of a tape head in a direction parallel to an axis of the pole piece; and
a fine positioner having a coil surrounding the pole piece for providing fine actuation of a tape head in a direction generally parallel to an axis of the pole piece.

16. A tape drive system, comprising:
a magnetic head;
a drive mechanism for passing a magnetic recording tape over the magnetic head;
a controller electrically coupled to the magnetic head for controlling a voltage of the conducting circuit of the magnetic head; and
an actuator device for selectively positioning the magnetic head relative to the magnetic recording tape, the actuator device comprising:
a pole piece;
at least one magnet for generating a magnetic field;
a coarse positioner having a coil surrounding the pole piece for providing coarse actuation in a direction parallel to an axis of the pole piece;
a fine positioner having a coil surrounding the pole piece for providing fine actuation in a direction generally parallel to an axis of the pole piece; and
a fine positioner bracket coupled to the coarse positioner, the magnetic head being coupled to the fine positioner bracket.

17. A system as recited in claim 16, wherein two magnets generate the magnetic field in the actuator.

18. A device as recited in claim 16, wherein the pole piece has a generally, but not limited to, cylindrical exterior.

19. A system as recited in claim 16, wherein the coils reside in a gap formed between the pole piece and the at least one magnet.

20. A system as recited in claim 16, wherein the fine positioner bracket is pivotally coupled to the coarse positioner.

21. A system as recited in claim 20, wherein the fine positioner bracket with the head coupled thereto have a combined center of mass positioned about at a point of pivoting of the fine positioner bracket.

22. A system as recited in claim 16, wherein no source of biasing for exerting a bias on the coarse positioner is present in the system.

23. A system as recited in claim 16, further comprising a damping mechanism for damping movement of the coarse positioner.

24. A system as recited in claim 23, wherein the damping mechanism is pneumatic.

25. A system as recited in claim 23, wherein the damping mechanism is frictional.

26. A system as recited in claim 16, wherein the actuator device further comprises a housing for constraining the magnetic field created by the at least one magnet.

27. A system as recited in claim 16, wherein the controller provides current to the coils for adjusting positions of the coarse and fine positioners based on servo signals received from the magnetic head.

28. A method for positioning a magnetic head relative to a tape, comprising:
sending a current through a coarse positioner of an actuator device coupled to the magnetic head for positioning the magnetic head at about a desired position relative to a magnetic tape passing across the head;
receiving servo signals from the magnetic head; and
sending a current through a fine positioner of the actuator device for aligning the magnetic head with servo tracks on the magnetic tape based on the servo signals received from the magnetic head,
wherein the actuator device comprises:
a pole piece;
at least one magnet for generating a magnetic field;
the coarse positioner having a coil surrounding the pole piece for providing coarse actuation in a direction parallel to an axis of the pole piece;
the fine positioner having a coil surrounding the pole piece for providing fine actuation in a direction generally parallel to an axis of the pole piece; and
a fine positioner bracket coupled to the coarse positioner, the magnetic head being coupled to the fine positioner bracket.

* * * * *

UNITED STATES PATENT AND TRADEMARK OFFICE
CERTIFICATE OF CORRECTION

PATENT NO. : 7,061,712 B2 Page 1 of 1
APPLICATION NO. : 10/992044
DATED : June 13, 2006
INVENTOR(S) : Harper et al.

It is certified that error appears in the above-identified patent and that said Letters Patent is hereby corrected as shown below:

In the claims:
col. 6, line 46 change "clam" to --claim--.

Signed and Sealed this

Seventh Day of November, 2006

JON W. DUDAS
*Director of the United States Patent and Trademark Office*